(12) United States Patent
Lehman et al.

(10) Patent No.: US 8,756,292 B2
(45) Date of Patent: Jun. 17, 2014

(54) SMART CACHE LEARNING MECHANISM IN ENTERPRISE PORTAL NAVIGATION

(75) Inventors: Doron Lehman, Kfar Vradim (IL); Nimrod Barak, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 292 days.

(21) Appl. No.: 13/404,288

(22) Filed: Feb. 24, 2012

(65) Prior Publication Data

US 2013/0227112 A1    Aug. 29, 2013

(51) Int. Cl.
*G06F 15/167*    (2006.01)

(52) U.S. Cl.
USPC ........................................................ 709/213

(58) Field of Classification Search
CPC ... H04L 29/08729; H04L 29/08801–29/08828
USPC ........... 709/212–216, 220–222; 711/118–146
See application file for complete search history.

(56) References Cited

U.S. PATENT DOCUMENTS

| | | | |
|---|---|---|---|
| 7,353,339 B2* | 4/2008 | Komarla et al. | 711/137 |
| 2005/0091456 A1* | 4/2005 | Huck | 711/118 |
| 2005/0144394 A1* | 6/2005 | Komarla et al. | 711/137 |

* cited by examiner

*Primary Examiner* — Brendan Higa
(74) *Attorney, Agent, or Firm* — Fish & Richardson P.C.

(57) ABSTRACT

The disclosure generally describes computer-implemented methods, software, and systems for optimizing portal navigation node caching. A computer-implemented method includes starting a learning process to analyze at least one navigation request to at least one navigation node, wherein the navigation request requests at least one property of the at least one navigation node, examining properties of the at least one navigation node, recording to a property list at least one requested navigation node property of the at least one navigation node, calculating, using at least one computer, a variance between the at least one navigation node property recorded to the property list, and determining whether the calculated variance is above a threshold.

24 Claims, 3 Drawing Sheets

SMART CACHE LEARNING MECHANISM IN ENTERPRISE PORTAL NAVIGATION

TECHNICAL FIELD

The present disclosure relates to computer-implemented methods, software, and systems for optimizing portal navigation node caching.

BACKGROUND

In a portal caching mechanism, portal navigation nodes are cached in order to increase runtime performance. In caching the portal navigation nodes, each portal navigation node is often cached in its entirety, regardless of navigation node property usage. Caching navigation nodes in this manner does not provide an organization full control over caching in order to optimize caching process performance and use of data storage space.

SUMMARY

The disclosure generally describes computer-implemented methods, software, and systems for optimizing the caching of portal navigation nodes. A learning process is started to analyze a navigation request to navigation node. The navigation request requests at least one property of the navigation node. The properties of the navigation node are examined and at least one requested navigation node property is recorded to a property list. A variance between navigation node properties in the property list is calculated and a determination is made whether the variance exceeds a threshold.

The present disclosure relates to computer-implemented methods, software, and systems for optimizing portal navigation node caching. One computer-implemented method includes: starting a learning process to analyze at least one navigation request to at least one navigation node, wherein the navigation request requests at least one property of the at least one navigation node, examining properties of the at least one navigation node, recording to a property list at least one requested navigation node property of the at least one navigation node, calculating, using at least one computer, a variance between the at least one navigation node property recorded to the property list, and determining whether the calculated variance is above a threshold.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with the general implementation, at least one navigation request is received by an enterprise portal.

A second aspect, combinable with any of the previous aspects, includes recording additional data associated with the at least one requested navigation node property to the property list.

In a third aspect, combinable with any of the previous aspects, the variance is calculated using the difference, as a function of time, between a determined top-most number of navigation node properties and a determined bottom-most number of navigation node properties recorded to the property list.

A fourth aspect, combinable with any of the previous aspects, includes stopping the learning process upon the determination the calculated variance exceeds the threshold and recording a last hit/miss ratio of a cache.

A fifth aspect, combinable with any of the previous aspects, includes generating a new property list.

A sixth aspect, combinable with any of the previous aspects, includes monitoring the hit/miss ratio of the cache, wherein the cache caches the navigation node properties as indicated in the new property list.

A seventh aspect, combinable with any of the previous aspects, includes determining whether the monitored miss ratio of the cache exceeds the miss ratio of the last recorded hit/miss ratio.

An eighth aspect, combinable with any of the previous aspects, includes restarting the learning process.

The subject matter described in this specification can be implemented in particular implementations so as to realize one or more of the following advantages. First, only relevant portal navigation node properties are cached, improving caching process performance and use of data storage space. Second, a threshold is automatically determined and used to decide which portal navigation node properties will/will not be cached. Third, a dynamic learning period allows the caching system to automatically adjust its caching behavior in response to portal usage. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
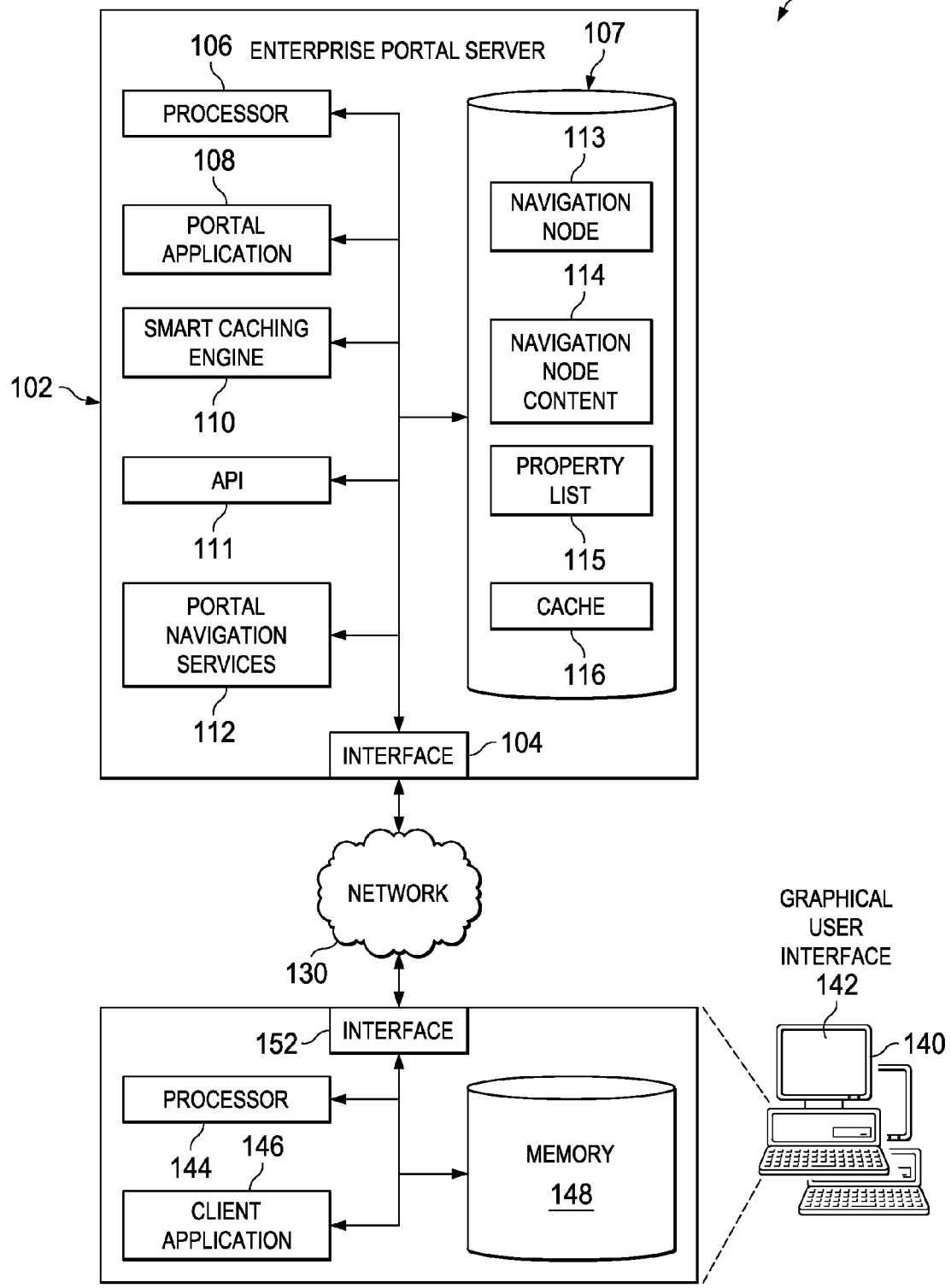
FIG. 1 illustrates an example system for optimizing portal navigation node caching.

The disclosure generally describes computer-implemented methods, software, and systems for optimizing portal navigation node caching. An enterprise portal, also known as an enterprise information portal (EIP) or a corporate portal, is a framework for integrating information, people, and processes across organizational boundaries. The enterprise portal provides a secure unified access point, often in the form of a Web-based user interface, and is designed to aggregate and personalize information through application-specific portals.

The enterprise portal is the de-centralized content contribution and content management system, which keeps the information always updated. With only a Web browser, users can begin work once they have been authenticated in the portal which offers a single point of access to information, enterprise applications, and services both inside and outside an organization. Portals may present information from diverse sources in a unified way, and provide additional services, such as dashboards, an internal search engine, e-mail, news, and various other features. Portals are often used by enterprises for providing their employees, customers, and possibly additional users with a consistent look and feel, and access control and procedures for multiple applications, which otherwise would have been separate entities altogether.

A business object can be considered a representation of a business entity, such as an employee, a sales order, an invoice, a financial report, etc. The business object may encompass both functions, for example in the form of methods, and data, such as one or more properties. For example, business objects may reduce system complexity by reducing a system into smaller units. The implementation details of business objects are typically hidden from a non-development user and may be accessed through the defined functions and encapsulated data. Business objects also form a point of entry of the functions and data of a system and enable the system to easily share, communicate, display, or otherwise operate with other systems.

Generally, through a graphical user interface (GUI), an enterprise portal user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a Web browser, a touch screen, or a command line interface (CLI) that processes information and efficiently presents the information results to the user. In general, a GUI may include a plurality of user interface (UI) elements, some or all associated with a Web browser, such as interactive fields, pull-down lists, and buttons operable by the enterprise portal user. These and other UI elements may be related to or represent the functions of the Web browser.

FIG. 1 illustrates an example distributed computing system 100 operable to optimize portal navigation node caching. Specifically, the illustrated environment 100 includes or is communicably coupled with an enterprise portal server 102 and a client 140 that communicate across a network 130.

In general, the enterprise portal server 102 is a server that stores one or more portal applications 108, where at least a portion of the portal applications 108 are executed via requests and responses sent to users or clients within and communicably coupled to the illustrated environment 100 of FIG. 1. In some implementations, the enterprise portal server 102 may store a plurality of various portal applications 108, while in other implementations, the enterprise portal server 102 may be a dedicated server meant to store and execute only a single portal application 108. In some implementations, the enterprise portal server 102 may comprise a Web server, where the portal applications 108 represent one or more Web-based applications accessed and executed by the client 140 via the network 130 or directly at the enterprise portal server 102 to perform the programmed tasks or operations of the portal application 108.

At a high level, the enterprise portal server 102 comprises an electronic computing device operable to receive, transmit, process, store, or manage data and information associated with the environment 100. Specifically, the enterprise portal server 102 illustrated in FIG. 1 is responsible for receiving application requests from one or more client applications associated with the client 140 of the environment 100 and responding to the received requests by processing said requests in the associated portal application 108, and sending the appropriate response from the portal application 108 back to the requesting client application 146. In addition to requests from the client 140, requests associated with the portal applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise portal server 102, environment 100 can be implemented using two or more servers 102, as well as computers other than servers, including a server pool. Indeed, enterprise portal server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated enterprise portal server 102 may be adapted to execute any operating system, including Linux, UNIX, Windows, Mac OS, Java, Android, iOS or any other suitable operating system. According to one implementation, enterprise portal server 102 may also include or be communicably coupled with an e-mail server, a Web server, a caching server, a streaming data server, and/or other suitable server.

The enterprise portal server 102 also includes an interface 104, a processor 106, and a memory 107. The interface 104 is used by the enterprise portal server 102 for communicating with other systems in a distributed environment—including within the environment 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated environment 100.

As illustrated in FIG. 1, the enterprise portal server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise portal server 102. Specifically, the processor 106 executes the functionality required to receive and respond to requests from the client 140 and/or perform caching functionality.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The enterprise portal server 102 also includes a memory 107, or multiple memories 107. The memory 107 may include any memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise portal server 102. Additionally, the memory 107 may include any other appropriate data, such as VPN applications, firmware logs and policies, firewall policies, a security or access log, print or other reporting files, as well as others.

The memory 107 includes a navigation node 113, navigation node content 114, a property list 115, and a cache 116. Although illustrated as single components, there may be more than one navigation node 113, navigation node content 114, property list 115, and cache 116.

Figure 2:
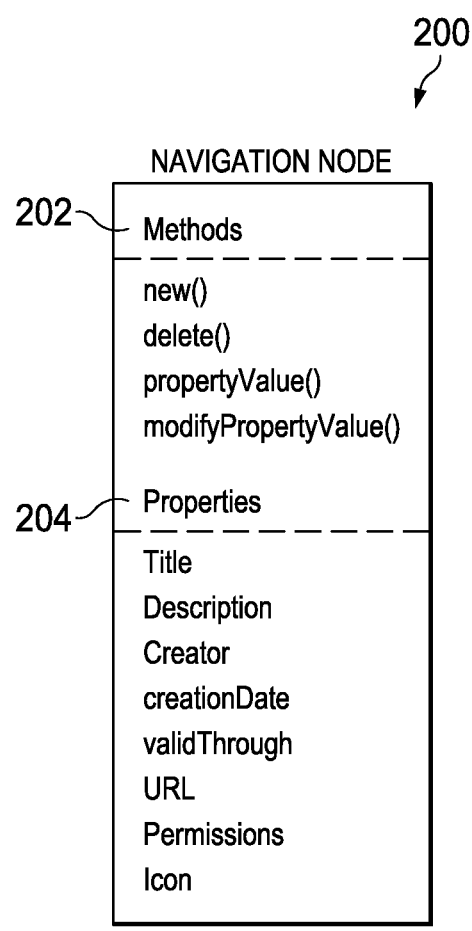
FIG. 2 is a block diagram illustrating an example navigation node.

The navigation node 113 can be considered the target of a request for data in an enterprise portal, for example a Web page, a view, the final destination of a navigation action, etc. In some implementations, a navigation node may be considered a business object. Turning now to FIG. 2, in FIG. 2 an example navigation node 200 is illustrated. The navigation node 200 includes methods 202, for example new( ), delete( ), propertyValue( ), etc. and properties 204, for example Title, Description, uniform resource locator (URL), Icon, etc. Although illustrated with example methods 202 and properties 204, actual methods and properties may vary depending on the specific use, scope, and need for a particular navigation node 200. Returning to FIG. 1, in some implementations, all navigation nodes 113 associated with an enterprise portal will have the same properties available, although not all properties may be applicable for specific navigation nodes. For example, a first navigation node 113 may have an associated Icon navigation node 113 property with a valid value, but a second navigation node may not use the Icon navigation node 113 property for any purpose. In this case, the value for the Icon navigation node 113 property in the second navigation node 113 may be set to a specific value or values, for example NULL, NIL, or other suitable value.

The navigation node content 114 is the textual, visual or aural content that is encountered as part of the user experience when accessing a navigation node 113 within an enterprise portal. The navigation node content 114 may include, among other things: text, images, sounds, videos and animations. While illustrated as integrated with memory 107 of the enterprise portal server in the example environment 100 of FIG. 1, in alternative implementations the navigation node content 114 can be external to the enterprise portal server 102 and/or from the example environment 100 or internal to the navigation node 113.

The cache 116 is a component of the enterprise portal server 102 that transparently stores data, for example navigation node content 114, so that future requests for that data from the enterprise portal server 102 can be served from the cache 116 as opposed to serving the data from an original data source, again for example, the navigation node content 114. Data stored within the cache 116 may be values that have been computed earlier or duplicates of original values that are stored elsewhere. If requested data is contained in the cache 116, i.e., a cache "hit," the data request can be served by reading the cache 116 and serving the read data. Otherwise, if requested data is not contained in the cache 116, i.e., a cache "miss," the data has to be recomputed or fetched from its original storage location, a process which is often slower than a cache hit. Hence, the greater number of requests that can be served from the cache 116, the faster the general overall performance of the enterprise portal server 102 in processing and serving data requests becomes.

In caching, a hit/miss ratio is the probability that a request for data will be served by a request to a cache. For example, a hit/miss ratio of seventy percent indicates that seventy out of every one-hundred requests for data are served from the cache. The percent of requests served from the cache are also referred to as a hit rate or a hit ratio, while the percent of requests not served from the cache are referred to as a miss rate or a miss ratio. In this example, the miss rate/miss ratio would be thirty percent. While illustrated as integrated with memory 107 of the enterprise portal server 102 in the example environment 100 of FIG. 1, in alternative implementations the cache 116 can be illustrated as a stand-alone component in example environment 100. Moreover, any or all parts of the cache 116 can be implemented as child or sub-modules of another software module or enterprise application (not illustrated) or of another hardware module (not illustrated) without departing from the scope of this disclosure.

The enterprise portal server 102 further includes portal navigation services 112. Generally, the portal navigation services 112 are responsible for the creation of the content hierarchy in the portal, and to provide access to all of the additional services provided in the "shell" of the portal (e.g., searching capabilities, personalization, modification, deletion, etc.). For example, the navigation services 112 may create a tree of navigation nodes for each user who enters the portal. As discussed above, each navigation node 113 represents specific content, or a collection of content, that can be viewed by the user. For each user, the portal navigation services 112 are responsible for generating a navigation tree of links to the portal content assigned to the user. An application—for example, a client running on a user's machine or an application running in the enterprise portal—can query the navigation services 112 for the current user's navigation hierarchy or tree, and then display this tree to the user. In some implementations, portal applications 108 can communicate with the navigation services 112 directly and/or via API 111. In some implementations, internal/external services, software, and/or other components, including those not illustrated, can communicate with the navigation services 112 directly and/or via the API 111.

The illustrated enterprise portal server 102 further includes a smart caching engine 110 to dynamically optimize and improve enterprise portal caching functionality. The smart caching engine 110 uses a learning process to record enterprise portal activity and specifically which portal navigation node 113 properties are accessed thorough enterprise portal navigation. In some implementations, all enterprise portal navigation requests are routed through the smart caching engine 110 and the information is collected with the smart caching engine 110. In some implementations, the smart caching engine 110 interfaces with the portal navigation services using the API 111. While the learning process is learning which navigation node 113 properties are accessed, the accessed navigation node 113 properties are written to a property list 115. In some implementations, the name of a navigation node 113 property and the number of times the navigation node 113 property has been accessed is written to the property list 115. In some implementations, additional data, such as the percentage a navigation node 113 property is used in the total number of analyzed navigations, can be written to the property list 115. For example, given twenty navigation node 113 properties in the property list 115, the top three navigation node 113 properties may be used 100% of the time, the fifth navigation node 113 property is used 50% of the time, and the twentieth navigation node 113 property is used 1% of the time.

In some implementations, the smart caching engine 110 records the entire enterprise portal navigation activity, a learning process, for a predetermined or calculated period of time. In some implementations, the learning process time period may be determined by an administrative user. In other implementations, the specified learning process time period may be dynamically determined by the smart caching engine 108 or other suitable component of the enterprise portal server and/or client. For example, a manual determination may establish that the learning process should run once a week, every twenty-four hours, etc. In the case of the automated process, the learning process may determine the learning process time period depending upon whether changes in the property list 115, a variance, have/have not exceeded a variance threshold. The variance threshold may be a value, for example ten percent, specifying that least ten percent of navigation node 113 properties associated with the property list 115, as a function of time, have been modified. For example, the smart caching engine 110 may monitor the number of navigation node 113 properties modified from both the top fifty-percent and bottom fifty percent of the property list 115. The percentage of changes made to the property list 115 is then determined. In some implementations, the determination can be made after a period of time, either predetermined and/or calculated, triggering event, or by some other data value internal or external to example environment 100. If the determined percentage of changes made to the property list 115 exceeds the variance threshold, the percentage of changes may be considered significant and the learning process allowed to continue (i.e., the smart caching engine is allowed to keep learning to optimize at least which navigation node 113 properties are stored within the cache 116). However, if the percentage of changes is equal to or does not exceed the variance threshold, the percentage of changes may be considered minor and the learning process may end (i.e., the cache 116 is determined to be optimized). In other implementations, the variance threshold can be other suitable values apart from a percentage that can establish a threshold. The variance threshold value may also be predetermined and/or calculated using data internal or external to example environment 100.

Once the learning process has ended, the current hit/miss ratio for the cache is recorded and a new property list 115 is created by the smart caching engine 110. In some implementations, the new property list 115 contains a subset of navigation node 113 properties taken from the property list 115 written by the learning process. In some implementations, the subset of navigation node 113 properties written to the new property list 115 can be determined manually, such as by an administrator. In other implementations, the subset of navigation node 113 properties written to the new property list 115 can be determined by a ratio threshold value of the percentage usage of the navigation node 113 properties in the property list 115. In some implementations, the percentage usage is determined by calculating the ratio between top-most used navigation node 113 properties and bottom-most-used navigation node 113 properties. For example, given the example above and twenty navigation node 113 properties recorded to the property list 115, a ratio may be dynamically calculated by the smart cache engine 110 between some number of top-most used navigation node 113 properties and bottom-most used navigation node 113 properties. If the ratio of the top most seven navigation node 113 properties verses the bottom-most 13 navigation node 113 properties does not exceed some ratio threshold value, the smart caching engine 110 may then try a comparison of the top-most five navigation node 113 properties in the property list 115 to the bottom-most fifteen. If top-most five navigation node 113 properties have an average percentage usage value of 51%, this may exceed the ratio threshold value and the five top-most navigation node 113 properties in the property list 115 would be written to the new property list 115 while the bottom-most thirteen navigation node 113 properties would be excluded. In another example, if the top-most eighteen navigation node 113 properties are used on average ninety percent of the time and the bottom-most two navigation node 113 properties are use ten percent of the time, given a ratio threshold value above 10%, the top-most eighteen navigation node 113 properties would be written to the new property list 115 and the bottom-most two navigation node 113 properties would be excluded. In other implementations, the ratio may be calculated with any suitable method using the navigation node 113 properties and additional data written to the property list 115. In some implementations, the ratio threshold value can be predetermined and/or calculated using data internal or external to example environment 100.

The new property list 115 is then used by the smart caching engine 110 to determine which navigation node 113 properties are cached by the smart caching engine 110 when accessed during navigation to navigation nodes 113 in the enterprise portal. For example, if a navigation node 113 property written to the new property list 115 is accessed and a value for the navigation node 113 property exists in the cache 116, the cached value is returned. Further, if a value does not exist in the cache 116, the value is retrieved, stored in the cache 116, and returned. If a navigation node 113 property is not written in the new property list 115 when it is requested, its value is retrieved from a source other than the cache 116, not stored in the cache 116, and returned.

In some implementations, the learning process period is dynamic and can automatically adjust itself on or off. For example, whether to turn the learning period back on may be determined by monitoring portal navigation node 113 property cache hit/miss ratios and comparing the determined hit/miss ratio to the hit miss ratio recorded by the smart cache engine 110 when the learning period last ended. For example, once the recorded miss ratio is determined to increase above the saved miss ratio value or some threshold value, the learning process may automatically restart to again optimize caching of portal navigation node 113 properties. For example, if the last recorded miss ratio was 35% and the monitored miss ratio rises to 55%, the learning process may restart.

The property list 115 is a list of navigation node 113 properties accessed in one or more various navigation nodes 113 in the course of navigating through the one or more navigation nodes 113 using the enterprise portal. For example, for the example navigation node shown in FIG. 2, if the Title, URL, and Icon navigation node 113 properties are accessed while navigating to this navigation node, these properties would be added to a property list 115. The property list 115 may be implemented as a text file, database file, or other suitable format for recording the accessed navigation nodes 113 properties. In some implementations, the smart caching engine 114 interfaces with the portal navigation services 114 directly and/or via the API 111 and creates, modifies, and deletes the property list 115. In some implementations, the property list 115 may be tied to a specific platform accessing the enterprise portal. For example, there may be a first property list 115 associated with on-premise computers, a second property list 115 associated with mobile devices, a third property list 115 associated with cloud-based platform computers, etc. In these implementations, each of these separate property lists 115 can be independently managed by the smart caching engine 114. In some implementations, an initial property list 115 may be manually created and then allowed to be modified by the smart caching engine 114. In some implementations, the initial property list 115 is created by the smart caching engine 114.

The enterprise portal server 102 further includes an application programming interface (API) 111 for interfacing between the smart caching engine 110 and the portal applications 108. Specifically, when the portal applications 108 employs (interface with) the smart caching engine 110, the portal application 108 utilizes the API 111 when delivering both cached and un-cached content to the client 140.

The illustrated environment of FIG. 1 also includes the client 140, or multiple clients 140. The client 140 may be any computing device operable to connect to or communicate with at least the enterprise portal server 102 via the network 130 using a wireline or wireless connection. In general, the client 140 comprises an electronic computer device operable to receive, transmit, process, and store any appropriate data associated with the environment 100 of FIG. 1.

The illustrated client 140 further includes a client application 146. The client application 146 is any type of application that allows the client 140 to request and view content on the client 140. In some implementations, the client application 146 can be and/or include a Web browser. In some implementations, the client-application 146 can use parameters, metadata, and other information received at launch to access a particular set of data from the server 102. Once a particular client application 146 is launched, a user may interactively process a task, event, or other information associated with the server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the environment 100—connected to the network 130; for example, the enterprise portal server 102, as well as other systems communicably coupled to the network 130 (not illustrated). Generally, the interface 152 comprises logic encoded in software and/or hardware in a suitable combination and operable to communicate with the network 130. More specifically, the interface 152 may comprise software supporting one or more communication protocols associated with communications such that the network 130 or interface's hardware is operable to communicate physical signals within and outside of the illustrated environment 100.

As illustrated in FIG. 1, the client 140 includes a processor 144. Although illustrated as a single processor 144 in FIG. 1, two or more processors may be used according to particular needs, desires, or particular implementations of the environment 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client 140. Specifically, the processor 144 executes the functionality required to send requests to the enterprise portal server 102 and to receive and process responses from the enterprise portal server 102.

The illustrated client 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 140. Additionally, the memory 148 may include any other appropriate data, such as VPN applications, firmware logs and policies, firewall policies, a security or access log, print or other reporting files, as well as others.

There may be any number of clients 140 associated with, or external to, the environment 100. For example, while the illustrated environment 100 includes one client 140, alternative implementations of the environment 100 may include multiple clients 140 communicably coupled to the enterprise portal server 102 and/or the network 130, or any other number suitable to the purposes of the environment 100. Additionally, there may also be one or more additional clients 140 external to the illustrated portion of environment 100 that are capable of interacting with the environment 100 via the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the enterprise portal server 102 or the client 140 itself, including digital data, visual information, or a graphic user interface (GUI) 142, as shown with respect to the client 140.

Further, the illustrated client 140 includes the GUI 142. The GUI 142 interfaces with at least a portion of the environment 100 for any suitable purpose, including generating a visual representation of a Web browser. In particular, the GUI 142 may be used to view and navigate various Web pages located both internally and externally to the enterprise portal server 102.

Figures 3, 4:
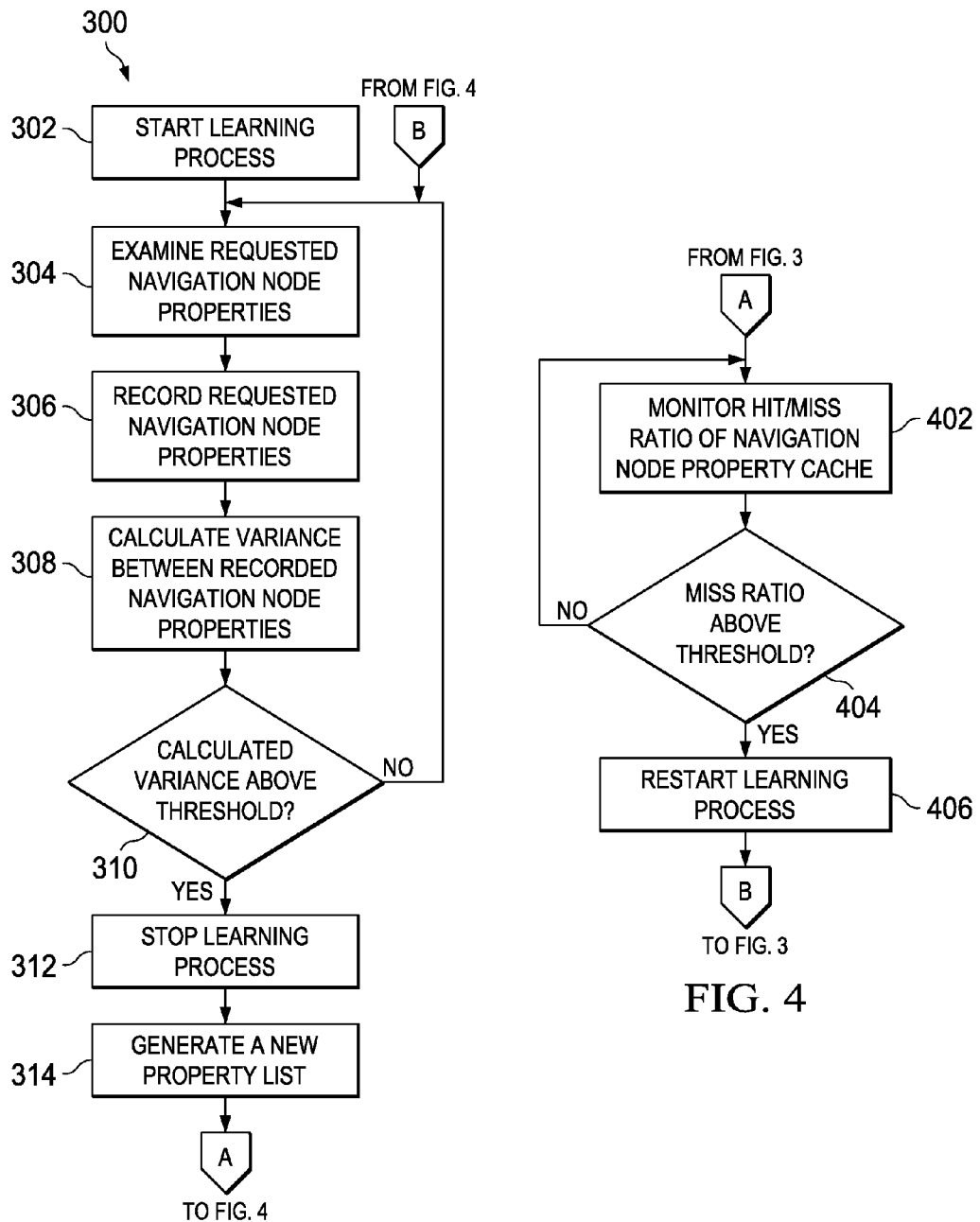
FIG. 3 is a flowchart of an example method for optimizing portal navigation node caching.
FIG. 4 is a flowchart of an example method for determining whether to restart the learning process.

FIG. 3 is a flowchart illustrating an example method 300 for optimizing the caching of portal navigation nodes. For clarity of presentation, the description that follows generally describes method 300 in the context of FIG. 1. However, it will be understood that method 300 may be performed, for example, by any other suitable system, environment, software, and hardware, or a combination of systems, environments, software, and hardware as appropriate. For example, one or more of the enterprise portal server, the client, or other computing device (not illustrated) can be used to execute method 300 and obtain any data from the memory of the client, the enterprise portal server, or the other computing device (not illustrated).

At 302, a learning process is started. From 302, method 300 proceeds to 304.

At 304, at least the navigation node properties requested in navigating to enterprise portal navigation nodes are examined. In some implementations, additional data, such as percentage usage for each additional navigation node property compared to the total number of enterprise portal navigation requests is determined. For example, a navigation node property "Icon" may be determined to have been requested and additional associated data updated indicating that the Icon navigation node property is requested in 95% of the enterprise portal navigation requests made. From 304, method 300 proceeds to 306.

At 306, the accessed navigation node properties and/or additional data are recorded to a property list. For example, the Icon navigation node property may be written to the property list along with the additional data indicating that the Icon navigation node property is requested in 95% of the enterprise portal navigation requests made. From 306, method 300 proceeds to 308.

At 308, a variance between the topmost and bottommost accessed node properties is calculated consistent with the description above. From 308, method 300 proceeds to 310.

At 310, a determination is made whether the calculated variance threshold is above a specified threshold. If at 310, it is determined that the calculated variance threshold is above a specified threshold, method 300 proceeds to 312. If at 310, however, it is determined that the calculated variance threshold did not exceed a specified threshold, method 300 proceeds to 304.

At 312, the learning process is stopped and the current cache hit/miss ratio is recorded by the smart caching engine. From 312, method 300 proceeds to 314.

At 314, a new property list is generated consistent with the description above. The cache then caches the values for only the navigation node properties in the new property list. For example, if the Description and Icon navigation node properties as illustrated in the example navigation node in FIG. 2 were written to the new property list, if a request was made for either the Description or Icon navigation node property while navigating to a navigation node, these two navigation node properties would be cached and subsequently served from the cache, while the other navigation node properties would not be cached and requests would be served by always returning to their origin data source to obtain their data. From 314, method 300 proceeds as indicated to the method as described in FIG. 4.

FIG. 4 is a flowchart illustrating an example method 400 is a flowchart of an example method for determining whether to restart the learning process. For clarity of presentation, the description that follows generally describes method 400 in the context of FIG. 1. However, it will be understood that method 400 may be performed, for example, by any other suitable system, environment, software, and hardware, or a combination of systems, environments, software, and hardware as appropriate. For example, one or more of the enterprise portal server, the client, or other computing device (not illustrated) can be used to execute method 400 and obtain any data from the memory of the client, the enterprise portal server, or the other computing device (not illustrated).

At 402, the hit/miss ratio of the cache is monitored. In some implementations, the cache hit/miss ratio may be monitored periodically. In other implementations, the cache hit/miss ratio may be monitored continually. From 402, method 400 proceeds to 404.

At 404, a determination is made whether the monitored miss ratio exceeds the last recorded miss ratio when the learning period last ended. If at 404, it is determined that the monitored miss ratio exceeds the last recorded miss ratio, method 400 proceeds to 406. If at 404, however, it is determined that the monitored miss ratio does not exceed the last recorded miss ratio, method 400 proceeds to 402.

At 406, the learning process is restarted. After 406, method 400 proceeds as indicated to the method as described in FIG. 3.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
    starting a learning process to analyze at least one navigation request to at least one navigation node, wherein the navigation request requests at least one property of the at least one navigation node;
    examining properties of the at least one navigation node;
    recording to a property list at least one requested navigation node property of the at least one navigation node;
    calculating, using at least one computer, a variance between the at least one navigation node property recorded to the property list, wherein the variance is calculated using the difference, as a function of time, between a determined top-most number of navigation node properties and a determined bottom-most number of navigation node properties recorded to the property list; and
    determining whether the calculated variance is above a threshold.

2. The method of claim 1, wherein the at least one navigation request is received by an enterprise portal.

3. The method of claim 1, further comprising recording additional data associated with the at least one requested navigation node property.

4. The method of claim 1, further comprising stopping the learning process upon the determination the calculated variance exceeds the threshold and recording a last hit/miss ratio of a cache.

5. The method of claim 4, further comprising generating a new property list.

6. The method of claim 5, further comprising monitoring the hit/miss ratio of the cache, wherein the cache caches the navigation node properties as indicated in the new property list.

7. The method of claim 6, further comprising determining whether the monitored miss ratio of the cache exceeds the miss ratio of the last recorded hit/miss ratio.

8. The method of claim 7, further comprising restarting the learning process.

9. A computer-program product, the computer program product comprising computer-readable instructions embodied on tangible, non-transitory media, the instructions operable when executed to perform operations comprising:
   starting a learning process to analyze at least one navigation request to at least one navigation node, wherein the navigation request requests at least one property of the at least one navigation node;
   examining properties of the at least one navigation node;
   recording to a property list at least one requested navigation node property of the at least one navigation node;
   calculating, using at least one computer, a variance between the at least one navigation node property recorded to the property list, wherein the variance is calculated using the difference, as a function of time, between a determined top-most number of navigation node properties and a determined bottom-most number of navigation node properties recorded to the property list; and
   determining whether the calculated variance is above a threshold.

10. The computer-program product of claim 9, wherein the at least one navigation request is received by an enterprise portal.

11. The computer-program product of claim 9, further comprising recording additional data associated with the at least one requested navigation node property.

12. The computer-program product of claim 9, further comprising stopping the learning process upon the determination the calculated variance exceeds the threshold and recording a last hit/miss ratio of a cache.

13. The computer-program product of claim 12, further comprising generating a new property list.

14. The computer-program product of claim 13, further comprising monitoring the hit/miss ratio of the cache, wherein the cache caches the navigation node properties as indicated in the new property list.

15. The computer-program product of claim 14, further comprising determining whether the monitored miss ratio of the cache exceeds the miss ratio of the last recorded hit/miss ratio.

16. The computer-program product of claim 15, further comprising restarting the learning process.

17. A system, comprising:
   memory operable to store at least one navigation node; and
   at least one hardware processor interoperably coupled to the memory and operable to:
      start a learning process to analyze at least one navigation request to at least one navigation node, wherein the navigation request requests at least one property of the at least one navigation node;
      examine properties of the at least one navigation node;
      record to a property list at least one requested navigation node property of the at least one navigation node;
      calculate, using at least one computer, a variance between the at least one navigation node property recorded to the property list, wherein the variance is calculated using the difference, as a function of time, between a determined top-most number of navigation node properties and a determined bottom-most number of navigation node properties recorded to the property list; and
      determine whether the calculated variance is above a threshold.

18. The system of claim 17, wherein the at least one navigation request is received by an enterprise portal.

19. The system of claim 17, further comprising recording additional data associated with the at least one requested navigation node property.

20. The system of claim 17, further comprising stopping the learning process upon the determination the calculated variance exceeds the threshold and recording a last hit/miss ratio of a cache.

21. The system of claim 20, further comprising generating a new property list.

22. The computer-program product of claim 21, further comprising monitoring the hit/miss ratio of the cache, wherein the cache caches the navigation node properties as indicated in the new property list.

23. The system of claim 22, further comprising determining whether the monitored miss ratio of the cache exceeds the miss ratio of the last recorded hit/miss ratio.

24. The system of claim 23, further comprising restarting the learning process.

* * * * *